United States Patent
Waits

[19]

[11] Patent Number: 6,126,358
[45] Date of Patent: Oct. 3, 2000

[54] FURNITURE PANEL STABILIZER

[75] Inventor: Dana Bryson Waits, Emerson, Ga.

[73] Assignee: Shaw Industries, Inc., Dalton, Ga.

[21] Appl. No.: 09/120,974

[22] Filed: Jul. 22, 1998

[51] Int. Cl.[7] ........................................................ F16B 9/02
[52] U.S. Cl. ........................... 403/346; 403/231; 403/403; 403/DIG. 10; 52/36.6
[58] Field of Search ..................... 403/346, 347, 403/403, 205, 231, 382, 294, 295, DIG. 10; 52/36.6, 285.1

[56] References Cited

U.S. PATENT DOCUMENTS

| | | |
|---|---|---|
| 3,490,797 | 1/1970 | Platte ..................................... 52/282.1 |
| 3,841,042 | 10/1974 | Siegal . |
| 4,203,578 | 5/1980 | Margueratt . |
| 4,269,005 | 5/1981 | Timmons . |
| 4,464,075 | 8/1984 | Kellogg . |
| 4,552,337 | 11/1985 | Wille . |
| 4,625,477 | 12/1986 | Johnstonbaugh . |
| 4,716,692 | 1/1988 | Harper et al. . |
| 4,784,509 | 11/1988 | Gozzano ............................ 403/403 X |
| 4,821,788 | 4/1989 | Nelson . |
| 4,846,443 | 7/1989 | Collins et al. . |
| 4,860,812 | 8/1989 | DePietro et al. . |
| 4,962,805 | 10/1990 | Allen . |
| 5,071,281 | 12/1991 | Murphy et al. . |
| 5,155,960 | 10/1992 | Shaanan . |
| 5,185,982 | 2/1993 | Hostetler . |
| 5,261,643 | 11/1993 | Wurdack . |
| 5,313,751 | 5/1994 | Wittler . |
| 5,385,335 | 1/1995 | Wurdack . |
| 5,447,386 | 9/1995 | Wurdack . |
| 5,605,412 | 2/1997 | Davis et al. ............................ 403/403 |

*Primary Examiner*—Harry C. Kim
*Attorney, Agent, or Firm*—Needle & Rosenberg, P.C.

[57] ABSTRACT

A furniture panel stabilizer, having a first lifting member moveably interlocked with a second lifting member, for preventing relative vertical movement between two adjoining furniture panels forming a corner. The first lifting member has a first end, an opposite second end, a top end, an opposite bottom end, and a first longitudinal axis extending between the first end and the second end. The second lifting member has a forward end, an opposite back end, an upper end, an opposite lower end, and a second longitudinal axis extending between the forward end and the back end. The first lifting member further has at least one first aperture and forms at least two longitudinally extending first rails and the second lifting member further has at least one second aperture and forms at least two longitudinally extending second rails, so that the first and second lifting members are movably interlocked when each first aperture circumscribes one second rail of the second lifting member so that the circumscribed second rail is slidably disposed within the first aperture. Hooks or wedges are fixedly attached to the respective first end of the first lifting member and the forward end of the second lifting member for detachably connecting the first and second lifting members to the slotted track of a first and second modular furniture panel so that, when the first and second lifting members are connected to the respective furniture panels, the furniture panel stabilizer prevents relative vertical movement between the two furniture panels.

34 Claims, 4 Drawing Sheets

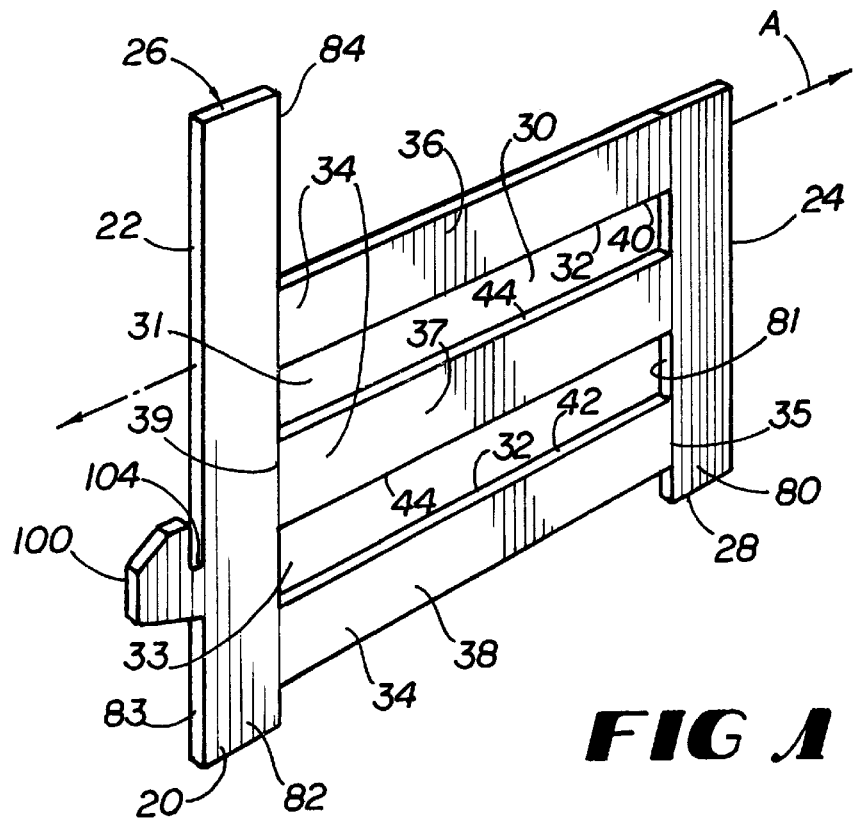

FURNITURE PANEL STABILIZER

BACKGROUND OF THE INVENTION

1. Field of the Invention

The present invention relates to an apparatus for stabilizing modular furniture panels and, more particularly, to an apparatus that has two interlocked members to prevent relative vertical movement between two adjacent furniture panels when lifting either panel.

2. Background Art

In the modem office environment, where systems furniture and local area networks have become standard office fixtures, modular furniture has allowed flexibility and efficiency in the design of the office workplace. Modular furniture typically includes walls, or panels, that are used to divide an open room to provide individual office spaces for employees and desired employee privacy. Since these panels typically do not span the entire height of the room (each panel being approximately five and a half (5½) feet high and six (6) feet wide), a desired openness is maintained. The individual panels may be secured together to form separate office spaces of nearly any desired configuration.

Each panel is also equipped with accessory hanging tracks that are used to hang bookshelves, desks, or other accessories from the panel. Normally, each panel has two accessory hanging tracks located near its vertical ends. These tracks generally are vertical metal strips integrated into the face of the panel that have a series of slots arranged along its vertical length. The tracks may be positioned so that its the slots also can be accessed from either side face of the panel.

Typically, accessories that are attached to a panel are connected using hooks that are received into the slots of the panel. Since the weight of an accessory can be quite heavy for a desk accessory or a loaded bookshelf, the accessory hanging track must be rigid and strong enough to be able to support the weight of the attached accessory.

Raceways at the bottom of each panel receive and contain power, telephone and computer network wires so that electricity, telephone, and computer communications, respectively, can be provided to each individual office space.

Offices are frequently carpeted for a variety of reasons, including cost, noise suppression, and comfort. In commercial installations, it is customary to cement the carpet to the floor to provide it with sufficient body to prevent undue wear. Today's modern modular furniture office environment has a major disadvantage when it comes to replacing the worn carpet. To minimize office disruption, it is preferred not to remove the furniture and modular office panels from the office space when it is necessary to replace the worn carpet. Otherwise each desk and work area must be cleared of all business supplies and personal items. All electrical, telephone and computer network systems must be disconnected and all computers, telephones, facsimile machines and so forth moved. The furniture or modular office panels are then disassembled as far as necessary and all of the items stored while the new carpet is laid. Accordingly, removing the furniture is expensive and inefficient based on the cost of the movers and the loss of staff productivity.

In response to the need to carpet without removing the furniture and the modular office panels from the office space, carpet tiles and furniture lifting devices have developed for use in offices with modular furniture. Carpet tiles or squares are used instead of contiguous broadloom carpeting in offices so that the tiles may be replaced individually when worn or damaged. Thus, one may replace the carpet tiles in the high-traffic areas without recarpeting an entire room. In conjunction, carpet installers have developed tools for lifting the modular furniture slightly off the floor to allow the old carpet tile to be removed and replaced with a new carpet tile. Thus, minimum disruption occurs when recarpeting an office.

When lifting and lowering the panels forming the modular office spaces, adjacent panels must be rigidly interconnected for stability and safety. If relative vertical movement occurs between adjacent panels, the result may be the panels breaking or disrupting the power, telephone and computer network system wires. The connection between adjacent panels are designed to prevent horizontal movement of each panel with respect to its neighboring panels and to add strength and rigidity to the connected panels. However, these connections are not designed to prevent relative vertical movement of each panel between adjacent panels because the panels are designed to rest on a stable floor surface that eliminates any requirement to design a form of relative vertical restraint. Thus, because these connections can not typically support the weight of one panel by another, attempting to raise a series of panels may result in a failure of the connections and the breakage of the modular furniture panel. The problem of preventing relative vertical movement of adjoining furniture pieces is especially difficult when the two adjoining panels form a corner.

One example of a comer stabilizer system to address lifting modular furniture is disclosed in U.S. Pat. No. 5,447,386, which issued to Wurdack. The Wurdack patent discloses a comer stabilizer that uses two separable forks that are both connected to each other and into two furniture panels that form a comer so that relative vertical movement between the panels is prohibited. In use, the tines of the first fork, the primary fork, are inserted into the respective slots of the hanging track of the first furniture panel so that slots formed in the primary fork align with the slots on the hanging track of the second furniture panel. The tines of the other fork, the locking fork, are first passed through the slots of the primary fork and then into the hanging track of the second furniture panel so that the two forks are interlocked. Both the primary fork tines and the locking fork tines are driven into and extend substantially through the hanging track. Since the relationship of the primary fork and the locking fork is fixedly positioned by the geometry of the slots and the locking tines, relative vertical movement of the primary fork and the locking fork does not occur, nor does vertical movement occur between the engaged captured furniture panels.

However, the device disclosed in the Wurdack patent has many disadvantages. The forks must be inserted into the length of the slot to function properly. Thus, the forks cannot be used in tracks that do not extend through the panel a sufficient depth. Another problem is that due to the fixed geometry of the forks, the primary fork must be oriented precisely so that the locking fork can be inserted through both the slots of the primary fork and those of the track of the other furniture panel. The primary and secondary forks are also difficult to remove after use, for which situation the patent discloses a complicated system to remove the "wedged" in forks.

SUMMARY OF THE INVENTION

The present invention overcomes the disadvantages of the prior art and provides a furniture panel stabilizer for joining two furniture panels forming a corner to prevent relative vertical movement between the joined furniture panels when the panels are lifted. Specifically, the furniture panel stabilizer comprises a first lifting member and a second lifting member that are movably interlocked with each other. The present invention also preferably includes a first means for connecting the first lifting member to a first furniture panel and a second means for connecting the second lifting member to a second furniture panel so that when the first and second lifting members are connected to the respective furniture panels, the furniture panel stabilizer prevents relative vertical movement between the two furniture panels.

The first lifting member defines at least one first aperture therein and forms at least two longitudinally extending first rails. Each first aperture has a contiguous edge circumscribing the first aperture and, preferably, the longitudinally extending edges of each of the first apertures are parallel to each other. In the embodiment of the present invention in which the first lifting member has one aperture and two rails, the first rail, called the top rail, is formed by the top end of the first lifting member and the upper longitudinally extending portion of the edge of the aperture and the second rail, called the bottom rail, is formed by the bottom end and the lower longitudinally extending portion of the edge of the aperture.

The second lifting member, similar to the first lifting member, defines at least one second aperture and forms at least two longitudinally extending second rails. In one embodiment, the second lifting member also has two rails and one aperture therebetween. The first and second lifting members are movably interlocked so that the first aperture of the first lifting member circumscribes one second rail of the second lifting member so that the circumscribed second rail is slidably disposed within the first aperture. In addition, the aperture of the second lifting member preferably circumscribes one rail of the first lifting member so that the circumscribed first rail is slidably disposed within the second aperture. Thus, one of the two rails of both lifting member is slidably disposed within the single aperture of the other lifting member in this embodiment.

The first and second connecting means, as noted above, are used to detachably connect the respective first and second lifting members to an upright integrally slotted track of a first furniture panel. The preferred first and second connecting means comprises one or more hooks on respective edges of the first and second lifting members. Each hook is adapted to detachably engage a slot of an integrally slotted track of the respective furniture panel. An alternate first and second connecting means comprises one or more wedges, which are each also adapted to detachably engage one slot of the integrally slotted track of the first furniture panel.

The present invention also includes other embodiments, in which there are more than two rails and one aperture in each lifting member. Any number of combinations of apertures within the respective first and second lifting members are possible if at least one rail of one lifting member is interlocked and circumscribed by one aperture of the other lifting member so that the circumscribed rail is slidably disposed within the aperture.

One example of an alternative embodiment of the present invention is the first lifting member having three first rails and two first apertures and the second lifting member having two second rails and one second aperture. The first and second lifting members are movably interlocked such that the two rails of the second lifting member are slidably disposed within and circumscribed by the two respective first apertures of the first lifting member. The middle rail of the first lifting member, accordingly, is disposed within and circumscribed by the second aperture of the second lifting member. Still another embodiment is for both the first and second lifting members to each having three rails and two apertures that are interlocked with each other in a similar manner described above for the other embodiments. As one skilled in the art will appreciate, other embodiments of the present invention can be constructed and used within the scope of this invention.

One skilled in the art will also appreciate that the present invention overcomes the difficulties associated with lifting modular furniture panels by providing a device that stabilizes the connection of two furniture panels forming a corner so that the panels can be rigidly interconnected for stability and safety and so that relative vertical movement between the two furniture panels is prevented when one or both of the furniture panels is lifted. Furthermore, the simplicity of use of the present invention saves time and effort.

In comparison to the device disclosed in the Wurdack patent having separable forks with a fixed horizontal geometric orientation relative to each other, the present invention locks furniture panels forming a corner using lifting members having interwoven rails that allow independent horizontal movement of the two lifting members relative to each other. The present invention thus enables the operator to position quickly and precisely attach the device to the appropriate slots of the furniture panel accessory hanging tracks. One associated advantage of the present invention are an improved range of movement and ease in orienting the first and second lifting members relative to each other. Other advantages include the ease of engaging and disengaging the lifting members from the furniture panels and the avoidance of the complicated removal method taught in the Wurdack patent.

BRIEF DESCRIPTION OF THE DRAWINGS

FIG. 1 is a perspective view showing a first lifting member having two first apertures and three first rails and showing a hook used to detachably connect the first lifting member to a integrally slotted track in a first furniture panel.

FIG. 2 is a perspective view showing a second lifting member having two second apertures and three second rails and also showing a hook used to detachably connect the second lifting member to a integrally slotted track in a second furniture panel.

DETAILED DESCRIPTION OF THE INVENTION

Figure 3:
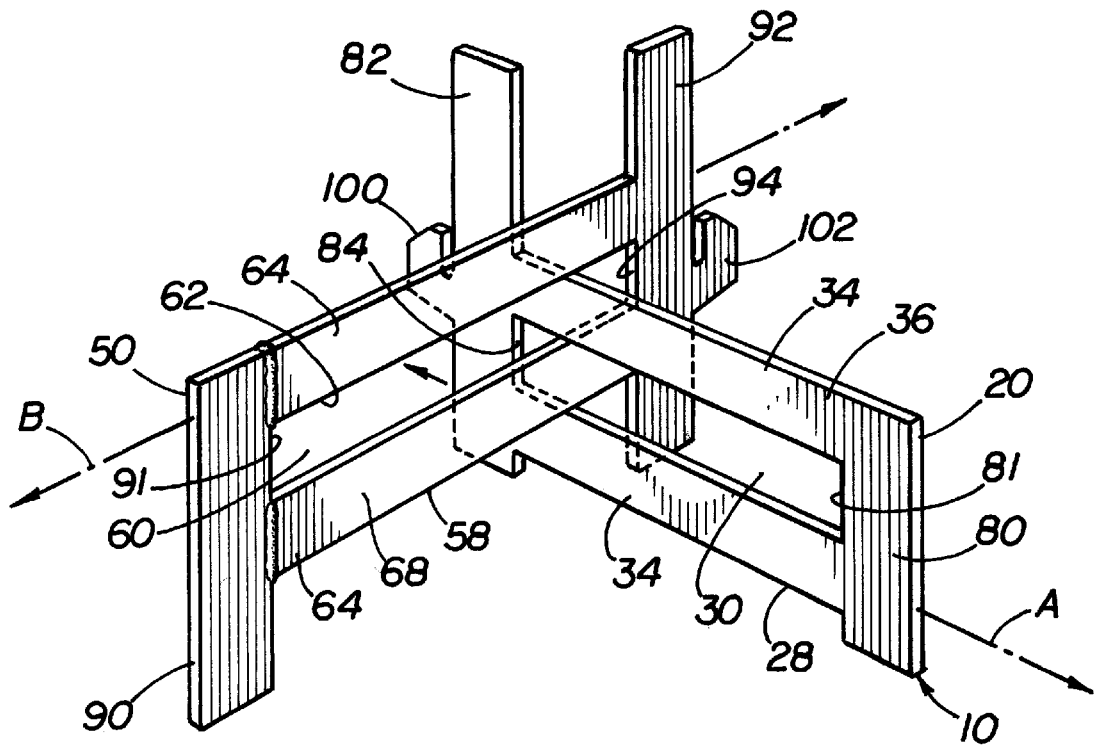
FIG. 3 is a perspective view of a first embodiment of the present invention showing the first lifting member with one first aperture and two first rails and the second lifting body with one second aperture and two second rails.

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described, in which like numbers indicate like parts throughout the figures.

Referring generally to FIGS. 1–9, various embodiments of the present invention are shown. Now referring specifically to FIGS. 3–5, three illustrative embodiments of the present invention are shown of a furniture panel stabilizer 10 that has a first lifting member 20 that is movably interlocked with a second lifting member 50. The shown embodiments include a first means for connecting the first lifting member 20 to a first furniture panel 16 and a second means for connecting the second lifting member 50 to a second furniture panel 18 so that, when the first and second lifting members 20, 50 are connected to the respective furniture panels 16, 18, the furniture panel stabilizer 10 prevents relative vertical movement between the two panels 16, 18.

Figure 5:
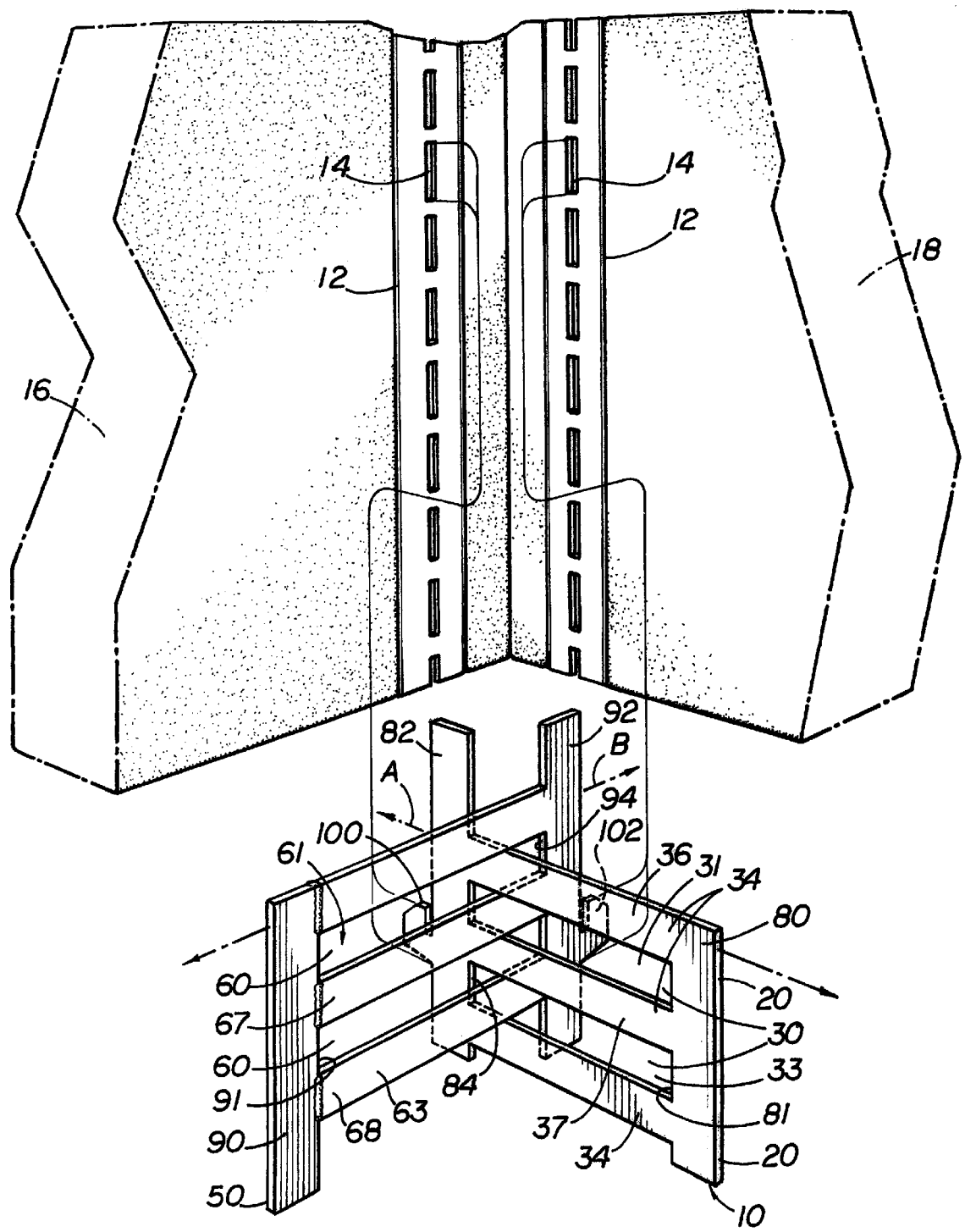
FIG. 5 is a perspective view of a third embodiment of the present invention showing the first lifting member with two first apertures and three first rails and the second lifting body with two second apertures and three second rails and also showing the first and second furniture panels having integrally slotted tracks attached thereto.

Referring now to FIG. 1, the first lifting member 20 of the furniture panel stabilizer 10 of one embodiment of the present invention, namely, the embodiment in FIG. 5, is shown. The first lifting member 20 consists of a first end 22, an opposite second end 24, a top end 26, and an opposite bottom end 28. The first lifting member 20 also has a first longitudinal axis A extending between the first end 22 and the second end 24. The first lifting member 20 has at least one first aperture 30 formed therein. Each first aperture 30 has a contiguous edge 32 circumscribing the first aperture 30 and it is preferred that the longitudinally extending portions of the edges 32 of each of the first apertures 30 of the first lifting member 20 are parallel to each other. The first lifting member 20, due to the existence of the first apertures 30, forms at least two first rails 34 that extend in a direction generally parallel to the first longitudinal axis A of the first lifting member 20. The first rails 34 include a top rail 36 and a bottom rail 38. The top rail 36 is formed intermediate the top end 26 of the first lifting member 20 and a longitudinally extending portion 40 of the edge 32 of the adjacent first aperture 30 that is closest to the top end 26. The bottom rail 38 is formed intermediate the bottom end 28 of the first lifting member 20 and a longitudinally extending portion 42 of the edge 32 of the first adjacent aperture that is closest to the bottom end 28.

The first rails 34 may also include at least one middle rail 37 if the first lifting member 20 has at least two first apertures 30, such as the embodiments shown in FIGS. 1 and 5. The one or more middle rails 37 of the first lifting member 20 are intermediate between the top rail 36 and the bottom rail 38 of the first lifting member 20 and are formed by a longitudinally extending portion 44 of two adjacent first apertures 30. If the first lifting member 20 has two apertures 30, the first aperture 30 adjacent the top end 26 of the first lifting member 20 is a top first aperture 31 and the first aperture 30 adjacent the bottom end 28 is a bottom first aperture 33, and the middle rail 37 is intermediate the top rail 36 and the bottom rail 38 and is formed by the longitudinally extending portions 44 of the top first aperture 31 and the bottom first aperture 33 of the first lifting member 20.

The first lifting member 20 may also, or alternatively, be described as having a first support member 80, a first arm member 82, and at least two first rails 34 that extend longitudinally. The first support member 80 has a first proximal support member face 81 and the first arm member 82 has a first face 83 and an opposite second face 84. Each first rail 34 has a first rail distal face 35 that is connected to the first proximal support member face 81 and a first rail proximal face 39 that is connected to the second face 84 of the first arm member 82. When the first rails 34 are connected to the first support member 80 and the first arm member 82, at least one first aperture 30 is formed between two adjacent first rails 34, the first arm member 82, and the first support member 80. Each first aperture 30 that is defined by the first lifting member 20 has a contiguous edge 32 as discussed above. Each first aperture 30 may be extended longitudinally if desired.

Referring now to FIG. 2, a second lifting member 50 of the furniture panel stabilizer 10 of the present invention is shown. The second lifting member 50 may be similar to the first lifting member 20 in form, as illustrated. The second lifting member 50 consists of a forward end 52, an opposite back end 54, a upper end 56, and an opposite lower end 58. The second lifting member 50 also has a second longitudinal axis B that extends between the forward end 52 and the back end 54. The second lifting member 50 defines at least one second aperture 60 therein with each second aperture 60 having a contiguous rim 62 circumscribing the second aperture 60. It is preferred that the longitudinally extending portions of the rim 62 of each of the second apertures 60 of the second lifting body are parallel to each other. The second apertures 60 in the second lifting member 50 form at least two second rails 64 that extend along the second longitudinal axis B of the second lifting member 50. These second rails 64 include, at a minimum, an upper rail 66 and a lower rail 68.

The upper rail 66 is formed intermediate the upper end 56 of the second lifting member 50 and a longitudinally extending portion 70 of the rim 62 of the adjacent second aperture 60 that is closest to the upper end 56. The lower rail 68 is intermediate the lower end 58 of the second lifting member 50 and a longitudinally extending portion 72 of the rim 62 of the second adjacent aperture 60 that is closest to the lower end 58. Furthermore, when the second lifting member 50 defines at least two second apertures 60, at least one center rail 67 is formed. The one or more center rails 67 of the second lifting member 50 are disposed between the upper rail 66 and the lower rail 68 of the second lifting member 50 and are formed by a longitudinally extending portion 74 of two adjacent second apertures 60. If the second lifting body has two second apertures 60, the second aperture 60 adjacent the upper end 56 of the second lifting member 50 is a upper second aperture 61 and the second aperture 60 adjacent the lower end 58 is a lower second aperture 63, and the center rail 67 is formed by the longitudinally extending portions 74 of the upper second aperture 61 and the lower second aperture 63 of the second lifting member 50.

Still referring to FIG. 2, the second lifting member 50 may also be described as having a second support member 90, a second arm member 92, and at least two second rails 64 that extend longitudinally. The second support member 90 has a second proximal support member face 91 and the second arm member 92 has a forward face 93 and an opposite back face 94. Each second rail has a second rail distal face 65 that is connected to the second proximal support member face 91 and a second rail proximal face 69 that is connected to the back face 94 of the second arm member 92. When the second rails 64 are connected to the second support member 90 and the second arm member 92, at least one second aperture 60 is formed between two adjacent second rails 64, the second arm member 92, and the second support member 90. As desired, the second apertures 60 may extend longitudinally.

One second rail 64 of the second lifting member 50 must be disposed within and circumscribed by one first aperture 30 of the first lifting member 20 for the furniture panel stabilizer 10 to be movably interlocked and for the furniture panel stabilizer 10 to prevent relative vertical movement therebetween. As one skilled in the art will appreciate, the reverse situation may exist in the scope of the present invention, i.e., one first rail 34 disposed within and circumscribed by one second aperture 60.

To provide support and to ensure a stable, secure engagement of the first and second lifting members 20, 50 to the first and second furniture panels 16, 18, respectively, it is preferred, as shown in FIG. 1, that the first face 83 of the first arm member 82 is disposed substantially perpendicular to the first longitudinal axis A of the first lifting member 20. Thus, the first face 83 can be in contact with the integrally slotted track 12 of the first furniture panel 16 when the first lifting member 20 is connected to the first furniture panel 16. As shown in FIG. 2, the forward face 93 of the second arm member 92 is preferably also disposed substantially perpendicular to the second longitudinal axis B of the second lifting member 50 so that the forward face 93 of the second arm member 92 can be in contact with the integrally slotted track 12 of the second furniture panel 18 when the second lifting member 50 is connected to the second furniture panel 18.

Referring now to FIGS. 1–2 and 5, for ease of construction of the furniture panel stabilizer 10 and for convenience of use, it is preferred that the first rails 34 of the first lifting member 20 be equally spaced apart from each other and that the second rails 64 of the second lifting member 50 be equally spaced apart from each other. Furthermore, as shown in FIGS. 1 and 2, it is preferred that the first arm member 82, the first support member 80, and the first rails 34 have surfaces that are coplanar, and that the second arm member 92, the second support member 90, and the second rails 64 also have surfaces that are coplanar. Moreover, it is preferred that each first rail 34 of the first lifting member 20 and each second rail of the second lifting member 50 have an elongated flat rectangular shape.

Figure 4:
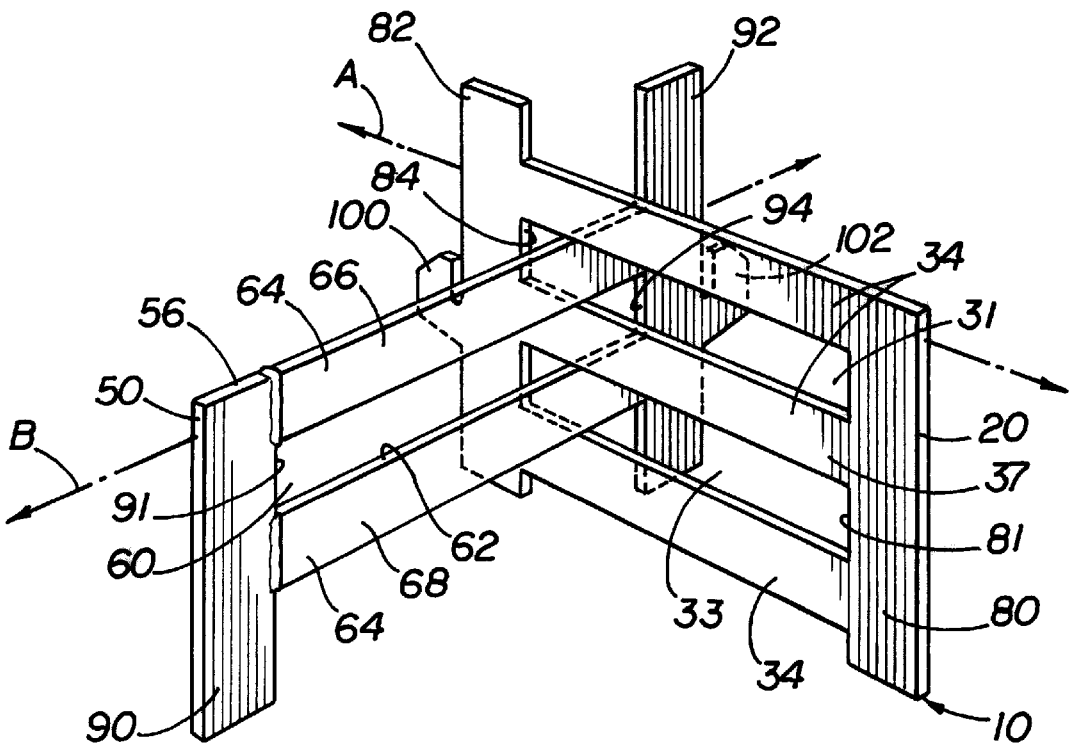
FIG. 4 is a perspective view of a second embodiment of the present invention showing the first lifting member having two first apertures and three first rails and the second lifting body with one second aperture and two second rails.

As shown in FIGS. 3–5, when the first and second lifting members 20, 50 are movably interlocked, each first aperture 30 circumscribes one, separate, second rail 64 formed by the second lifting member 50. Since the second aperture 60 is preferably elongated longitudinally, each circumscribed second rail 64 of the second lifting member 50 is slidably disposed within the circumscribing first aperture 30. Thus, the second lifting member 50 may be pivoted through an angular range of approximately 5–175 degrees relative to the first longitudinal axis A of the first lifting member 20. The second lifting member 50 can also slide laterally relative to the first longitudinal axis A, along the length of the second aperture 60, i.e., until the second proximal support member face 91 of the second support member 90 is brought into contact with a first rail 34 of the first lifting member 20 or until the back face 94 of the second arm member 92 strikes the first rail 34 of the first lifting member 20. This freedom of movement of the second lifting member 50 relative to the first lifting member 20 is allowed by the furniture panel stabilizer 10 of the present invention while achieving the objective of prohibiting relative vertical movement between the interlocked first and second lifting members 20, 50.

When the first and second lifting members 20, 50 are moveably interlocked, as described above, each second aperture 60 circumscribes one of the first rails 34 of the first lifting member 20. Preferably, each first aperture 30 is also elongated longitudinally so that the circumscribed first rail 34 may be slidably disposed within the second aperture 60. The longitudinally elongated first aperture 30 allows the first lifting member 20 to slide relative to the second lifting member 50, along the first longitudinal axis A, within the defined constraints of second aperture 60. The first lifting member 20 can thus be moved until the second face 84 of the first arm member 82 of the first lifting member 20 abuts one side of the second rail 64 of the second lifting member 50 or until the first proximal support face 81 of the first support member 80 abuts the other side of the second rail 64. Thus, if both the first and second lifting members 20, 50 have longitudinally elongated first and second apertures 30, 60, both the first and second lifting members 20, 50 may be pivoted angularly (approximately 5–175 degrees, relative to the respective first and second longitudinal axis A, B) and slid (within the constraints of the circumscribing aperture, relative to the respective first and second longitudinal axis A, B) with respect to the opposite interlocked lifting member. This pivoting and sliding movement does not allow relative vertical movement when the first and second longitudinal axis A, B, of the first and second lifting members 20, 50, respectively, are both oriented horizontally.

Figure 6:
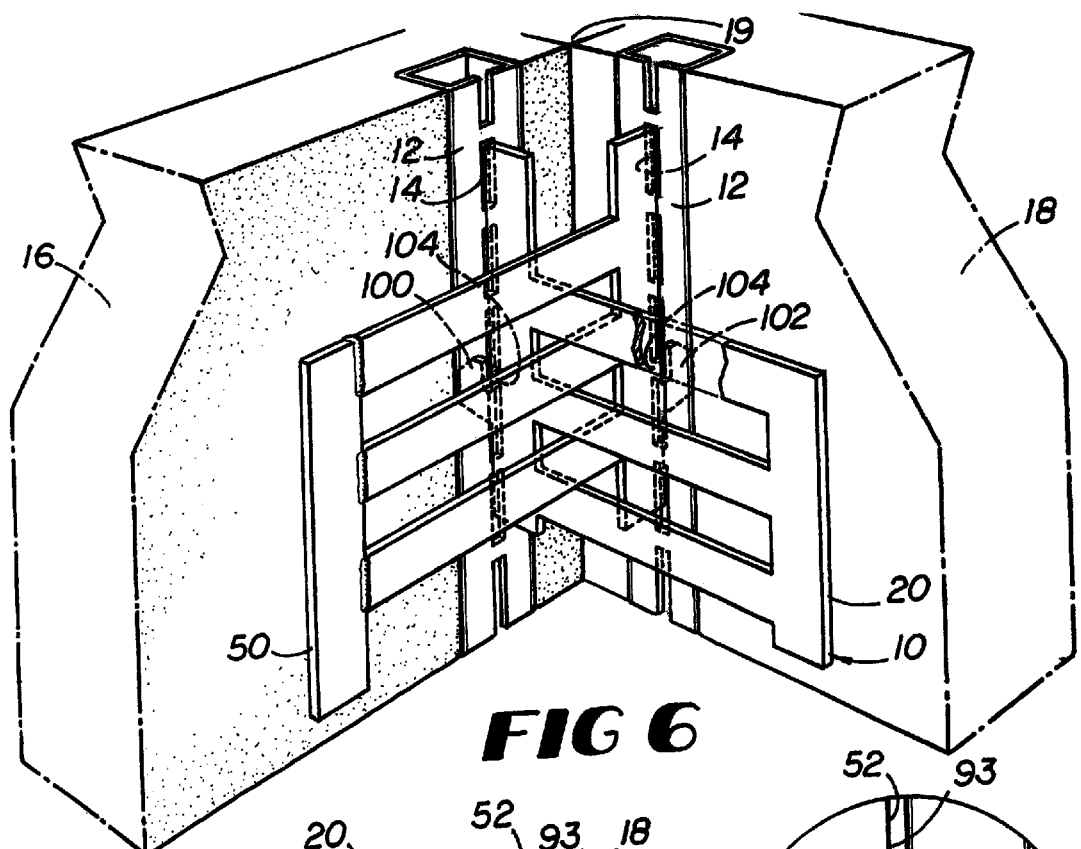
FIG. 6 is a cutaway perspective view of FIG. 5 showing the first and second lifting members secured to the two furniture panels.

Referring to FIG. 6, the first and second lifting members 20, 50 are detachably attached to a substantially vertical, or upright, integrally slotted track 12 that is embedded into each of the first and second furniture panels 16, 18 that form a corner 19 therebetween. Because relative vertical movement perpendicular to the horizontally disposed longitudinal axis A, B of the interlocked first and second lifting members 20, 50 is prohibited, the furniture panel stabilizer 10 will prevent relative vertical movement between the connected first and second furniture panels 16, 18 since the first and second lifting members 20, 50 of the furniture panel stabilizer 10 are connected to the furniture panels.

Referring now to FIGS. 1, 2, and 5–9, the first lifting member 20 has a first means for detachably connecting the first lifting body to the integrally slotted track 12 of the first furniture panel 16. This first connecting means is fixedly attached to the first end 22 (or, alternatively described, the first face 83) of the first lifting member 20. Similarly, each second lifting member 50 has a second means for detachably connecting the second lifting body to the integrally slotted track 12 of a second furniture panel 18. The second connecting means is fixedly attached to the forward end 52 (or alternatively described, the forward face 93) of the second lifting member 50.

Figure 7:
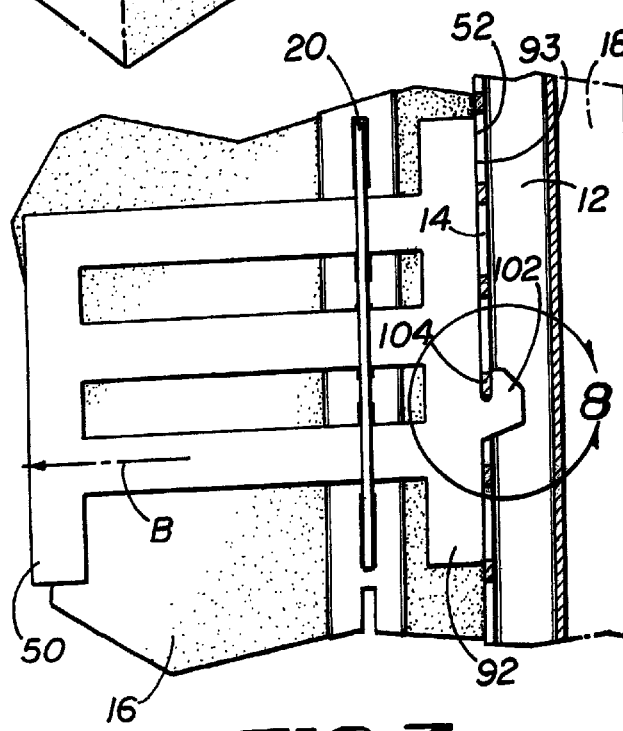
FIG. 7 is a partial cross-section plan view of FIG. 6 showing a hook of a lifting member of the furniture panel stabilizer detachably engaged with a slot in the integrally slotted track of one furniture panel.
Figure 8:
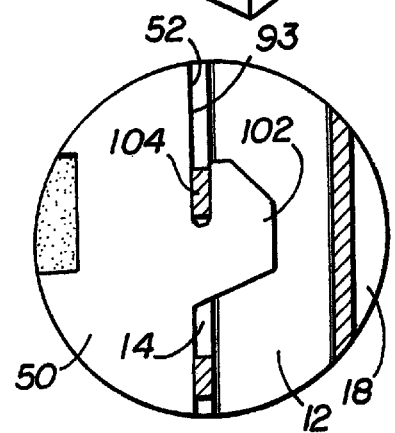
FIG. 8 is a fragmentary plan view showing the hook of FIG. 7 used to detachably connect the lifting member to the respective integrally slotted track in the furniture panel.

As shown in FIGS. 1–7, and in detail in FIG. 8, the preferred first and second connecting means comprises at least one first hook 100 on the first lifting member 20 and at least one second hook 102 on the second lifting member 50, respectively. A hook is presently preferred because it provides a convenient, yet secure, method to detachably engage the lifting member to its respective furniture panel. The first hook 100 extends from the first end 22 of the first lifting member 20 away from the second end 24 of the first lifting body and each first hook 100 is adapted to detachably engage one slot 14 of the integrally slotted track 12 of the first furniture panel 16. Alternatively described, the first hook 100 extends from the first face 83 of the first arm member 82 of the first lifting member 20 away from the second face 84 of the first arm member 82.

Similarly, the second hook 102 extends from the forward end 52 of the second lifting member 50 away from the back end 54 of the second lifting member 50. Alternatively described, the second hook 102 extends from the forward face 93 of the second arm member 92 of the second lifting member 50 away from the back face 94 of the second arm member 92. Each second hook 102 is adapted to detachably engage one slot 14 of the integrally slotted track 12 of a furniture panel.

As one skilled in the art will appreciate, and as shown in FIGS. 1–2 and 5–7, the first hook 100, or first hooks 100, may be located anywhere on the first face 83 of the first arm member 82 of the first lifting member 20. However, to take advantage of the applied leverage of the first lifting member 20, it is preferred that the first hook 100 be positioned on the first face 83 near the bottom end 28 of the first lifting member 20. Similarly, the second hook 102, or second hooks 102, may be located anywhere on the forward face 93 of the second arm member 92 of the second lifting member 50. But, it is preferred that the second hook 102 be located on the forward face 93 of the second lifting member 50 near the lower end 58 of the second lifting member 50.

As shown in FIGS. 7 and 8, the preferred shape of the first and second hooks 100, 102 is a "J" shape that has a capture slit 104 that is sized and adapted to detachably engage one slot 14 of the integrally slotted track 12. As shown in FIGS. 5–8, the capture slits 104 of the first and second hooks 100, 102 are preferably substantially perpendicular to the respective first and second longitudinal axis A, B so that the first and second lifting members 20, 50 can preferably be connected and secured to the integrally slotted track 12 of the respective first and second furniture panels 16, 18 in a substantially vertical orientation. The preferred shape of the capture slits 104 of the first and second hooks 100, 102 is an elongated "U" shape so that the possibility of stress fractures forming between the hooks 100, 102 and their respective first and second lifting members 20, 50 is minimized. Referring back now to FIGS. 1 and 2, it is also preferred that the side surfaces of the first hook 100 are coplanar with the surfaces of the first lifting member 20 and the side surfaces of the second hook 102 are coplanar with the surfaces of the second lifting member 50.

Figure 9:
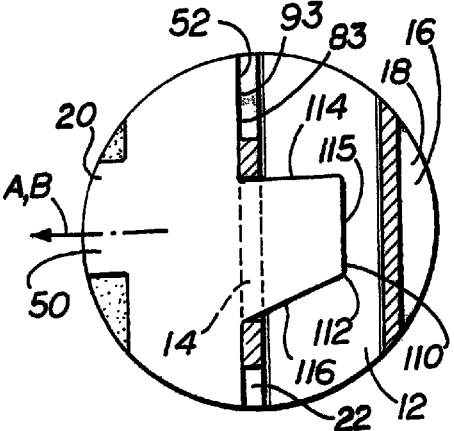
FIG. 9 is a fragmentary plan view similar to FIG. 8 and showing a wedge used to detacably connect the lifting member to the respective integrally slotted track in the furniture panel.

As shown in detail in FIG. 9, an alternative first and second connecting means is a first wedge 110 on the first lifting member 20 and a second wedge 112 on the second lifting member 50 respectively. The first wedge 110 extends from the first end 22 of the first lifting member 20 away from the second end 24 of the first lifting member 20 (alternatively described, the first wedge 110 extends from the first face 83 of the first arm member 82 of the first lifting member 20 away from the second face 84 of the first arm member 82). Each first wedge 110 is adapted to detachably engage one slot 14 of the integrally slotted track 12 of the first furniture panel 16, similar to the first hook 100.

Likewise, the second wedge 112 extends from the forward end 52 of the second lifting member 50 away from the back end 54 of the second lifting member 50 and each second wedge 112 is adapted to detachably engage one slot 14 of the integrally slotted track 12 of the second furniture panel 18. Alternatively described, the second wedge 112 extends from the forward face 93 of the second arm member 92 of the second lifting member 50 away from the back face 94 of the second arm member 92.

As shown in FIG. 9, the first and second wedges 110, 112 preferably have the same shape. Each of the first and second wedges 110, 112 has a top edge 114, a side edge 115, and a bottom edge 116. The top edge 114 is connected to first end 22 of first lifting member 20 and extends substantially parallel to the longitudinal axis A, B of the respective first and second lifting members 20, 50. The side edge 115 is connected to the top edge 114 and is disposed substantially perpendicular to the longitudinal axis A, B of the respective first and second lifting members 20, 50. The bottom edge 116 is connected to the side edge 115 and extends from the side edge 115 to the first end 22 of first lifting member 20. The width of the wedge 110, 112 taken at the side edge 115 is smaller than the width of the wedge 110, 112 taken as the wedge 110, 112 approaches the respective end 22, 52 of the first and second lifting members 20, 50.

The first and second wedges 110, 112 are each sized and adapted to detachably engage one slot 14 of the integrally slotted track 12. It is preferred that the side surfaces of the first wedge 110 are coplanar with the surface of the first lifting member 20 and the side surfaces of the second wedge 112 are coplanar with the surface of the second lifting member 50 so that the first and second lifting members 20, 50 can preferably be connected and secured to the integrally slotted track 12 of the respective first and second furniture panels 16, 18 in a substantially vertical orientation.

Referring again to FIGS. 5 and 6, the first and the second furniture panels 16, 18 are arranged at right angles to each other, such as in the corner of a modular furniture work space. Generally, there is some connector mechanism (not shown) which hold the two furniture panels 16, 18 in a fixed horizontal relationship. Connectors include square brackets, bolts, or some other appropriate device for stationarily holding the two panels 16, 18 together. Connectors are designed to prevent horizontal movement of the panels 16, 18 and can be damaged if the connector is used to suspend the first furniture panel 16 while the second, connected, furniture panel 18 is lifted. The present invention provides the additional support to prevent such damage from occurring.

To lock the first and second furniture panels 16, 18, prevent relative vertical movement therebetween as one panel is lifted, each first hook 100 of the first lifting member 20 is passed into one slot 14 of the integrally slotted track 12 of the first furniture panel 16. Once the first hook 100 is in place, or contemporaneously with the insertion of the first hook 100, each second hook 102 of the second lifting member 50 is inserted into one slot 14 of the integrally slotted track 12 of the second furniture panel 18. Orientation and insertion of the respective first and second hooks 100, 102 is greatly simplified due to the freedom of relative horizontal movement, parallel to the first and second longitudinal axis A, B, of the interlocked first and second lifting members 20, 50 that is allowed by the first and second apertures 60 of the first and second lifting members 20, 50. The first and second lifting members 20, 50 are then pushed vertically upwardly (or downwardly, if the first and second lifting members 20, 50 are inserted into the slots 14 with the first and second hooks 100, 102 oriented downwardly) into the slots 14 until the first and second hooks 100, 102 firmly engages their respective slots 14. Once the first hook 100 and the second hook 102 are properly inserted, the panels 16, 18 are locked together to prevent vertical movement of one panel with respect to the other.

If the wedges 110, 112, shown in FIG. 9, serve as the first and second connecting means, the procedure is similar to using the hooks 100, 102. The first wedge 110 of the first lifting member 20 is passed into one slot 14 in the integrally slotted track 12 of the first furniture panel 16. Contemporaneously with the insertion of the first wedge 110, or after the first wedge 110 is in place, the second wedge 112 of the second lifting member 50 is inserted into one slot 14 in the integrally slotted track 12 of the second furniture panel 18. The first and second lifting members 20, 50 are then pushed into their respective slots 14 until the first and second wedges 110, 112 are firmly engaged. The expanding width of the first and second wedges 110, 1 12 ensures the secure engagement of the first and second wedges 110, 112 with the slots 14 of the integrally slotted track 12 of the first and second furniture panels 16, 18 and ensures that the first and second furniture panels 16, 18 are locked together to prevent relative vertical movement of one panel with respect to the other.

As the first furniture panel 16 is lifted by, for example, a jack (not shown), the upward lifting force is translated from the slot 14 in the first furniture panel 16 to the first lifting member 20 attached thereto by its connecting means. The jack is connected to another portion of the furniture panel other then than the location of the lifting member. Because the first rails 34 of the first lifting member 20 are interlocked with and interface with the second rails 64 of the second lifting member 50, the second lifting member 50 is forced to move correspondingly upwardly. The upward force on the second lifting member 50 lifts the second furniture panel 18, in which the upward lifting force is translated through the connecting means of the second lifting member 50 to the slot 14 of the second furniture panel 18. As one skilled in the art would appreciate, the reverse situation may exist in the scope of the present invention, i.e., the second furniture panel 18, or another furniture panel that is fixedly connected to either the first or second furniture panels 16, 18, may be the panel that is lifted.

Any number of combinations of apertures 30, 60 within the respective first and second lifting members 20, 50 are possible so long as at least one second rail 64 is interlocked and circumscribed by one first aperture 30 so that the circumscribed second rail 64 is slidably disposed within the first aperture 30. Referring to FIG. 3, a first embodiment of the furniture panel stabilizer 10 of the present invention is shown. The first lifting member 20 has one first aperture 30 and two first rails 34 and the second lifting member 50 has two second rails 64 and one second aperture 60. Preferably, the lower rail 68 of the second lifting member 50 is slidably disposed within and circumscribed by the first aperture 30 of the first lifting member 20 that is adjacent the bottom end 28 of the first lifting member 20 so that the first and second lifting members 20, 50 are moveably interlocked. The second aperture 60 of the second lifting device is elongated longitudinally along the second longitudinal axis B so that the second lifting member 50 may be slid horizontally relative to the first lifting member 20 within the constraints imposed by the rim 62 of the second aperture 60.

The top rail 36 of the first lifting member 20 is disposed within and circumscribed by the second aperture 60 of the second lifting member 50 adjacent the bottom end 28 of the second lifting member 50. Still referring to FIG. 3, if it is desired to allow the first lifting member 20 to be slidably disposed relative to the second lifting member 50, the first aperture 30 of the first lifting member 20 is elongated along the first longitudinal axis A, so that the top rail 36 of the first lifting member 20 may be slid horizontally relative to the second lifting member 50 within the constraints provided by the elongated first aperture 30. When both the first and second apertures 60 are elongated longitudinally along their respective first and second longitudinal axis A, B, both first and second lifting members 20, 50 may be pivoted angularly and slid with respect to the opposite interlocked lifting member.

A second embodiment of the furniture panel stabilizer 10 of the present invention is shown in FIG. 4. In this embodiment, the first lifting member 20 has three first rails 34 and two first closed apertures (instead of having just one first aperture 30 and two first rails 34 as described above) and the second lifting member 50 has two second rails 64 and one second aperture 60. The upper rail 66 of the second lifting member 50 is slidably disposed within and circumscribed by the top first aperture 31 of the first lifting member 20 and the lower rail 68 of the second lifting member 50 is slidably disposed within and circumscribed by the bottom first aperture 33 of the first lifting member 20 so that the first and second lifting members 20, 50 are movably interlocked. Due to the elongated second aperture 60 of the second lifting member 50, the second lifting member 50 may be slid horizontally relative to the first lifting member 20 within the constraints provided by the rim 62 of the second aperture 60.

Still referring to FIG. 3, the middle rail 37 of the first lifting member 20 is disposed within and circumscribed by the second aperture 60 of the second lifting member 50 adjacent the upper end 56 of the second lifting member 50. If it is desired to allow the first lifting member 20 to be slidably disposed relative to the second lifting member 50, the top first aperture 31 and the bottom first aperture 33 of the first lifting member 20 are elongated along the first longitudinal axis A, so that the middle rail 37 of the first lifting member 20 may be slidably disposed within the second aperture 60 and slid horizontally relative to the second lifting member 50 within the constraints provided by the elongated first apertures 30. When both the first and second apertures 60 are elongated longitudinally along their respective first and second longitudinal axis A, B as shown in FIG. 4, both first and second lifting members 20, 50 may be pivoted angularly and slid with respect to the opposite interlocked lifting member.

Referring now to FIG. 5, a third embodiment of the furniture panel stabilizer 10 of the present invention is shown wherein the first lifting member 20 has three first rails 34 and two first apertures 30 and the second lifting member 50 has three second rails 64 and two second apertures 60. The first and second lifting members 20, 50 are movably interlocked when the lower rail 68 of the second lifting member 50 is slidably disposed within and circumscribed by the bottom first aperture 33 of the first lifting member 20 and the center rail 67 of the second lifting member 50 is slidably disposed within and circumscribed by the top first aperture 31 of the first lifting member 20. Due to the elongated upper second aperture 61 and lower second aperture 63 of the second lifting member 50, the second lifting member 50 may be slid horizontally relative to the first lifting member 20 within the constraints provided by the rims 62 of the second apertures 60.

The middle rail 37 of the first lifting member 20 is disposed within and circumscribed by the lower second aperture 63 of the second lifting member 50 and the top rail 36 of the first lifting member 20 is disposed within and circumscribed by the upper second aperture 61 of the second lifting member 50. The top first aperture 31 and the bottom first aperture 33 of the first lifting member 20 are preferably elongated along the first longitudinal axis A, so that the middle rail 37 and the top rail 36 of the first lifting member 20 are slidable disposed and may thus slide horizontally relative to the second lifting member 50 within the constraints provided by the elongated first apertures 30. As shown in FIG. 5, when both the first and second apertures 60 are elongated longitudinally along their respective first and second longitudinal axis A, B, both first and second lifting members 20, 50 may be pivoted angularly and slid with respect to the opposite interlocked lifting member.

Although only two types of connecting means are shown in FIGS. 1–9 for detachably connecting the first and second lifting members 20, 50 to the respective first and second furniture panels 16, 18, any type of connecting means may be used. Thus, the detachable connection feature of the first and second lifting members 20, 50 of the present invention is not limited to the connecting means described above, but, rather, can be connected in a manner well within the level of ordinary skill of one in the modular furniture or furniture moving fields.

Furthermore, although the present invention has been described with reference to three specific embodiments and to specific details of the present invention, it is not intended that such detail should be regarded as limitations upon the scope of the invention except as and to the extent that they are included in the accompanying claims. Accordingly, it is not intended that the scope of the claims appended hereto be limited to the description as set forth herein, but rather that the claims be construed as encompassing all the features that would be treated as equivalence thereof by those skilled in the are to which this invention pertains.

What is claimed is:

1. A furniture panel stabilizer, comprising:
    a. a first lifting member having a first end, an opposite second end, a top end, an opposite bottom end, and a first longitudinal axis extending between the first end and the second end, the first lifting member defining at least one first aperture therein having a contiguous edge circumscribing the first aperture, and wherein the first lifting member forms at least two longitudinally extending first rails, including a top rail intermediate the top end and a longitudinally extending portion of the edge of the adjacent first aperture closest to the top end and a bottom rail intermediate the bottom end and a longitudinally extending portion of the edge of the adjacent first aperture closest to the bottom end;
    b. a second lifting member having a forward end, an opposite back end, an upper end, an opposite lower end, and a second longitudinal axis extending between the forward end and the back end, the second lifting member defining at least one second aperture therein having a contiguous rim circumscribing the second aperture, and wherein the second lifting member forms at least two longitudinally extending second rails, including an upper rail intermediate the upper end and a longitudinally extending portion of the rim of the adjacent second aperture closest to the upper end and a lower rail intermediate the lower end and a longitudinally extending portion of the rim of the second adjacent aperture closest to the bottom end,
    wherein the first and second lifting members are movably interlocked in which the lower rail of the second lifting member is slidably disposed within and circumscribed by the first aperture of the first lifting member adjacent the bottom end of the first lifting member;
    c. first means, fixedly attached to the first end of the first lifting member, for detachably connecting the first lifting member to an upright integrally slotted track of a first furniture panel; and
    d. second means, fixedly attached to the forward end of the second lifting member, for detachably connecting the second lifting member to an upright integrally slotted track of a second furniture panel, wherein, when the first and second lifting members are connected to the respective furniture panels, the furniture panel stabilizer prevents relative vertical movement between the two furniture panels.

2. The furniture panel stabilizer of claim 1, wherein the top rail of the first lifting member is slidably disposed within and circumscribed by the second aperture of the second lifting member adjacent the lower end of the second lifting member.

3. The furniture panel stabilizer of claim 1, wherein the first lifting member defines two first apertures therein, a top first aperture adjacent the top end of the first lift member and a bottom first aperture adjacent the bottom end thereof, and wherein the first lifting member forms three longitudinal rails, including the top rail, the bottom rail, a middle rail, in which the middle rail is defined by a longitudinally extending portion of two adjacent first apertures and intermediate the top rail and the bottom rail.

4. The furniture panel stabilizer of claim 3, wherein the first and second lifting members are movably interlocked in which the upper rail of the second lifting member is slidably disposed within and circumscribed by the top first aperture of the first lifting member and the lower rail of the second lifting member is slidably disposed within and circumscribed by the bottom first aperture thereof.

5. The furniture panel stabilizer of claim 4, wherein the middle rail of the first lifting member is slidably disposed within and circumscribed by the second aperture of the second lifting member adjacent the upper end of the second lifting member.

6. The furniture panel stabilizer of claim 3, wherein the second lifting member defines two second apertures therein, an upper second aperture adjacent the upper end of the second lifting member and a lower second aperture adjacent the lower end of the second lifting member, wherein the second lifting member forms three longitudinal rails, including the upper rail, the lower rail, and a center rail, in which the center rail is defined by a longitudinally extending portion of two adjacent second apertures, and wherein the first and second lifting members are movably interlocked in which the lower rail of the second lifting member is slidably disposed within and circumscribed by the bottom first aperture of the first lifting member and the center rail of the second lifting member is slidably disposed within and circumscribed by the top first aperture of the first lifting member.

7. The furniture panel stabilizer of claim 6, wherein the middle rail of the first lifting member is slidably disposed within and circumscribed by the lower second aperture of the second lifting member and the top rail of the first lifting member is slidably disposed within and circumscribed by the upper second aperture of the second lifting member.

8. The furniture panel stabilizer of claim 1, wherein the first connecting means comprises at least one first hook, extending from the first end of the first lifting member away from the second end thereof, each first hook adapted to detachably engage a slot of the integrally slotted track of the first furniture panel, and wherein the second connecting means comprises at least one second hook, extending from the forward end of the second lifting member away from the back end, each second hook adapted to detachably engage one slot of the integrally slotted track of the second furniture panel.

9. The furniture panel stabilizer of claim 1, wherein the first connecting means comprises a first wedge, extending from the first end of the first lifting member away from the second end thereof, the wedge adapted to detachably engage a slot of the integrally slotted track of the first furniture panel, and wherein the second connecting means comprises a second wedge, extending from the forward end of the second lifting member away from the back end, each second wedge adapted to detachably engage one slot of the integrally slotted track of the second furniture panel.

10. The furniture panel stabilizer of claim 1, wherein the longitudinally extending portions of the edge of each first aperture of the first lifting member are parallel to each other and wherein the longitudinally extending portions of the rim of each second aperture of the second lifting member are parallel to each other.

11. A furniture panel stabilizer, comprising:
 a) a first lifting member having a first support member, a first arm member, a first longitudinal axis extending between the first arm member and the first support member, and at least two longitudinally extending first rails, the first support member having a first proximal support member face, the first arm member having a first face and an opposite second face, each first rail having a first rail distal face connected to the first proximal support member face and a first rail proximal face connected to the second face of the first arm member, in which the first rails, the first arm member, and the first support member defines at least one first aperture formed between two adjacent first rails, the first arm member, and the first support member;
 b) a second lifting member having a second support member, a second arm member, a second longitudinal axis extending between the second arm member and the second support member, and at least two longitudinally extending second rails, the second support member having a second proximal support member face, the second arm member having a forward face and an opposite back face, each second rail having a second rail distal face connected to the second proximal support member face and a second rail proximal face connected to the second arm member back face, in which the second rails, the second arm member, and the second support member defines at least one second closed aperture formed between two adjacent second rails, the second arm member, and the second support member,
 wherein the first and second lifting members are movably interlocked in which each first aperture circumscribes one second rail of the second lifting member so that the circumscribed second rail is slidably disposed within the first aperture;
 c) first means, fixedly attached to the first face of the first lifting member, for detachably connecting the first lifting member to an upright integrally slotted track of a first furniture panel; and
 d) second means, fixedly attached to the forward face of the second lifting member, for detachably connecting the second lifting member to an upright integrally slotted track of a second furniture panel,
wherein, when the first and second lifting members are connected to the respective furniture panels, the furniture panel stabilizer prevents relative vertical movement between the two furniture panels.

12. The furniture panel stabilizer of claim 11, wherein the first and second lifting members are movably interlocked in which each second aperture circumscribes one first rail of the first lifting member so that the circumscribed first rail is slidably disposed within the second aperture.

13. The furniture panel stabilizer of claim 1, wherein the first arm member is disposed substantially perpendicular to the first longitudinal axis of the first lifting member and wherein the second arm member is substantially perpendicular to the second longitudinal axis of the second lifting member.

14. The furniture panel stabilizer of claim 13, wherein each first aperture of the first lifting member has a contiguous edge circumscribing that first aperture and wherein the longitudinally extending portions of the edge of each first aperture are parallel to each other, and wherein each second aperture of the second lifting member has a contiguous rim circumscribing the second aperture and wherein the longitudinally extending portions of the rim of each second aperture are parallel to each other.

15. The furniture panel stabilizer of claim 14, wherein the first rails of the first lifting member are equally spaced apart from each other and wherein the second rails of the second lifting member are equally spaced apart from each other.

16. The furniture panel stabilizer of claim 11, wherein the first connecting means comprises at least one first hook, extending from the first face of the first arm member of the first lifting member away from the second face thereof, each first hook adapted to detachably engage a slot of the integrally slotted track of the first furniture panel, and wherein the second connecting means comprises at least one second hook, extending from the forward face of the second arm member of the second lifting member away from the back face thereof, each second hook adapted to detachably engage one slot of the integrally slotted track of the second furniture panel.

17. The furniture panel stabilizer of claim 11, wherein the first connecting means comprises a first wedge, extending from the front face of the first arm member of the first lifting member away from the second face thereof, the first wedge adapted to detachably engage a slot of the integrally slotted track of the first furniture panel, and wherein the second connecting means comprises a second wedge, extending from the forward face of the second arm member of the second lifting member away from the back face thereof, the second wedge adapted to detachably engage one slot of the integrally slotted track of the second furniture panel.

18. The furniture panel stabilizer of claim 12, wherein the first lifting member has two first rails and one first aperture and the second lifting member has two second rails and one second aperture.

19. The furniture panel stabilizer of claim 12, wherein the first lifting member has three first rails and two first apertures and the second lifting member has two second rails and one second aperture.

20. The furniture panel stabilizer of claim 12, wherein the first lifting member has three first rails and two first apertures and the second lifting member has three second rails and two second apertures.

21. A furniture panel stabilizer, comprising:
 a. a first lifting member having a first end, an opposite second end, a top end, an opposite bottom end, and a first longitudinal axis extending between the first end and the second end, the first lifting member defining at least one first aperture therein having a contiguous edge circumscribing the first aperture, and wherein the first lifting member forms at least two longitudinally extending first rails;
 b. a second lifting member having a forward end, an opposite back end, an upper end, an opposite lower end, and a second longitudinal axis extending between the forward end and the back end, the second lifting member defining at least one second aperture therein having a contiguous rim circumscribing the second aperture, and wherein the second lifting member forms at least two longitudinally extending second rails, wherein the first and second lifting members are movably interlocked in which each first aperture circumscribes one second rail of the second lifting member so that the circumscribed second rail is slidably disposed within the first aperture;

c. first means, fixedly attached to the first end of the first lifting member, for detachably connecting the first lifting member to an upright integrally slotted track of a first furniture panel; and d. second means, fixedly attached to the forward end of the second lifting member, for detachably connecting the second lifting member to an upright integrally slotted track of a second furniture panel, wherein, when the first and second lifting members are connected to the respective furniture panels, the furniture panel stabilizer prevents relative vertical movement between the two furniture panels.

22. The furniture panel stabilizer of claim 21, wherein the first and second lifting members are movably interlocked in which each second aperture circumscribes one first rail of the first lifting member so that the circumscribed first rail is slidably disposed within the second aperture.

23. The furniture panel stabilizer of claim 21, wherein the first connecting means comprises at least one first hook, extending from the first end of the first lifting member away from the second end thereof, each first hook adapted to detachably engage a slot of the integrally slotted track of the first furniture panel, and wherein the second connecting means comprises at least one second hook, extending from the forward end of the second lifting member away from the back end, each second hook adapted to detachably engage one slot of the integrally slotted track of the second furniture panel.

24. The furniture panel stabilizer of claim 21, wherein the first connecting means comprises a first wedge, extending from the first end of the first lifting member away from the second end thereof, the wedge adapted to detachably engage a slot of the integrally slotted track of the first furniture panel, and wherein the second connecting means comprises a second wedge, extending from the forward end of the second lifting member away from the back end, each second wedge adapted to detachably engage one slot of the integrally slotted track of the second furniture panel.

25. The furniture panel stabilizer of claim 21, wherein the longitudinally extending portions of the edge of each first aperture of the first lifting member are parallel to each other and wherein the longitudinally extending portions of the rim of each second aperture of the second lifting member are parallel to each other.

26. The furniture panel stabilizer of claim 22, wherein the first lifting member has two first rails and one first aperture and the second lifting member has two second rails and one second aperture.

27. The furniture panel stabilizer of claim 22, wherein the first lifting member has three first rails and two first apertures and the second lifting member has two second rails and one second aperture.

28. The furniture panel stabilizer of claim 22, wherein the first lifting member has three first rails and two first apertures and the second lifting member has three second rails and two second apertures.

29. A furniture panel stabilizer, comprising:

a. a first lifting member having a first end, an opposite second end, a top end, an opposite bottom end, and a first longitudinal axis extending between the first end and the second end, the first lifting member defining at least one first aperture therein having a contiguous edge circumscribing the first aperture, wherein the first lifting member forms at least two longitudinally extending first rails, including a top rail intermediate the top end and a longitudinally extending portion of the edge of the adjacent first aperture closest to the top end and a bottom rail intermediate the bottom end and a longitudinally extending portion of the edge of the adjacent first aperture closest to the bottom end, and wherein the first lifting member has at least one joining member, extending from the first end of the first lifting member away from the second end thereof, each joining member adapted to detachably engage a slot of an integrally slotted track of a first furniture panel;

b. a second lifting member having a forward end, an opposite back end, an upper end, an opposite lower end, and a second longitudinal axis extending between the forward end and the back end, the second lifting member defining at least one second aperture therein having a contiguous rim circumscribing the second aperture, wherein the second lifting member forms at least two longitudinally extending second rails, including an upper rail intermediate the upper end and a longitudinally extending portion of the rim of the adjacent second aperture closest to the upper end and a lower rail intermediate the lower end and a longitudinally extending portion of the rim of the second adjacent aperture closest to the bottom end, and wherein the second lifting member has at least one joining member, extending from the forward end of the second lifting member away from the back end, each joining member adapted to detachably engage one slot of an integrally slotted track of a second furniture panel, wherein the first and second lifting members are movably interlocked in which the lower rail of the second lifting member is slidably disposed within and circumscribed by the first aperture of the first lifting member adjacent the bottom end of the first lifting member, and wherein, when the joining member of the first lifting member and the joining member of the second lifting member are connected to the respective furniture panels, the furniture panel stabilizer prevents relative vertical movement between the two furniture panels.

30. The furniture panel stabilizer of claim 29, wherein the joining member has a hook shape.

31. The furniture panel stabilizer of claim 29, wherein the joining member has a wedge shape.

32. A furniture panel stabilizer, comprising:

a. a first lifting member having a first end, an opposite second end, a top end, an opposite bottom end, and a first longitudinal axis extending between the first end and the second end, the first lifting member defining at least one first aperture therein having a contiguous edge circumscribing the first aperture, wherein the first lifting member forms at least two longitudinally extending first rails, and wherein the first lifting member has at least one joining member, extending from the first end of the first lifting member away from the second end thereof, each joining member adapted to detachably engage a slot of an integrally slotted track of a first furniture panel;

b. a second lifting member having a forward end, an opposite back end, an upper end, an opposite lower end, and a second longitudinal axis extending between the forward end and the back end, the second lifting member defining at least one second aperture therein having a contiguous rim circumscribing the second aperture, wherein the second lifting member forms at least two longitudinally extending second rails, and wherein the second lifting member has at least one joining member, extending from the forward end of the second lifting member away from the back end, each joining member adapted to detachably engage one slot of an integrally slotted track of a second furniture panel, wherein the first and second lifting members are movably interlocked in which each first aperture circumscribes one second rail of the second lifting member so that the circumscribed second rail is slidably disposed within the first aperture, and wherein, when the joining member of the first lifting member and the joining member of the second lifting member are connected to the respective furniture panels, the furniture panel stabilizer prevents relative vertical movement between the two furniture panels.

33. The furniture panel stabilizer of claim 32, wherein the joining member has a hook shape.

34. The furniture panel stabilizer of claim 32, wherein the joining member has a wedge shape.

\* \* \* \* \*